(12) United States Patent
Yang et al.

(10) Patent No.: US 7,555,998 B2
(45) Date of Patent: Jul. 7, 2009

(54) SYSTEM AND METHOD FOR HYDRAULIC VALVE ACTUATION

(75) Inventors: Zhou Yang, South Windsor, CT (US); Andrew Brzoska, Burlington, CT (US); Brian Ruggiero, East Granby, CT (US); David B Smith, Westfield, MA (US); James Judd, Union, SC (US); Neil Fuchs, New Hartford, CT (US); Michael Dailey, Bloomfield, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 11/290,518

(22) Filed: Dec. 1, 2005

(65) Prior Publication Data

US 2007/0125327 A1    Jun. 7, 2007

(51) Int. Cl.
*F01L 9/02* (2006.01)
(52) U.S. Cl. ............. 123/90.12; 123/90.15; 251/129.15
(58) Field of Classification Search ............... 123/90.13, 123/90.15, 90.12; 251/29, 129.15
See application file for complete search history.

(56) References Cited

U.S. PATENT DOCUMENTS

| 5,746,175 | A  | * | 5/1998  | Hu ............................... 123/322 |
| 2002/0157623 | A1 | * | 10/2002 | Turner et al. ............. 123/90.12 |
| 2002/0157624 | A1 | * | 10/2002 | Janak ....................... 123/90.12 |
| 2003/0140876 | A1 | * | 7/2003  | Yang et al. ................ 123/90.12 |
| 2004/0103868 | A1 | * | 6/2004  | Engelberg ................ 123/90.12 |

* cited by examiner

*Primary Examiner*—Zelalem Eshete
(74) *Attorney, Agent, or Firm*—David R. Yohannan, Esq.; Kelley Drye & Warren LLP

(57) ABSTRACT

Systems and methods for hydraulic and/or variable valve actuation of engine valves are disclosed. An embodiment of the present invention may include a hydraulic valve actuation system operatively connected to an engine valve. First and second control valves may be operatively connected to the hydraulic valve actuation system and adapted to selectively release hydraulic fluid from the hydraulic valve actuation system independent of one another. The first control valve is preferably a solenoid actuated trigger valve and the second control valve is preferably a mechanically or hydraulically actuated valve.

23 Claims, 4 Drawing Sheets

SYSTEM AND METHOD FOR HYDRAULIC VALVE ACTUATION

FIELD OF THE INVENTION

The present invention relates generally to a system and method for actuating an engine valve in an internal combustion engine. In particular, the present invention relates to a system and method that may provide hydraulic and/or variable actuation of intake, exhaust, and auxiliary engine valves in an internal combustion engine.

BACKGROUND OF THE INVENTION

Valve actuation in an internal combustion engine is required in order for the engine to produce positive power. During positive power, one or more intake valves may be opened to admit fuel and air into a cylinder for combustion. One or more exhaust valves may be opened to allow combustion gas to escape from the cylinder. Intake, exhaust, and/or auxiliary valves also may be opened during positive power at various times to recirculate gases for improved emissions.

Engine valve actuation also may be used to produce engine braking and exhaust gas recirculation (EGR) when the engine is not being used to produce positive power. During engine braking, the exhaust valves may be selectively opened to convert, at least temporarily, the engine into an air compressor. In doing so, the engine develops retarding horsepower to help slow the vehicle down. This can provide the operator with increased control over the vehicle and substantially reduce wear on the service brakes of the vehicle.

In many internal combustion engines, the intake and exhaust valves may be opened and closed by fixed profile cams, and more specifically by one or more fixed lobes that are an integral part of each of the cams. Benefits such as increased performance, improved fuel economy, lower emissions, and better vehicle driveablity may be obtained if the intake and exhaust valve timing and lift can be varied. The use of fixed profile cams, however, can make it difficult to adjust the timings and/or amounts of engine valve lift in order to optimize them for various engine operating conditions, such as different engine speeds.

One proposed method of adjusting valve timing and lift, given a fixed cam profile, has been to provide variable valve actuation by incorporating a "lost motion" device in the valve train linkage between the valve and the cam. Lost motion is the term applied to a class of technical solutions for modifying the valve motion proscribed by a cam profile with a variable length mechanical, hydraulic, or other linkage assembly. In a lost motion system, a cam lobe may provide the "maximum" lift motion needed over a full range of engine operating conditions. A variable length system may then be included in the valve train linkage, intermediate of the valve to be opened and the cam providing the maximum motion, to selectively extend the duration of the maximum lift past the duration provided by the cam and/or subtract or lose part or all of the lift provided by the cam.

This variable length system (or lost motion system) may, when expanded fully, transmit all of the cam motion to the valve and even extend the duration of the valve event beyond that normally provided by the cam, and when contracted fully, transmit none or a minimum amount of the cam motion to the valve. An example of one lost motion system and method is provided in Hu, U.S. Pat. Nos. 5,537,976 and 5,680,841, which are assigned to the same assignee as the present application and which are incorporated herein by reference.

The aforementioned '841 patent contemplates the use of a high speed trigger valve to control the release of hydraulic fluid from the lost motion system. High speed lost motion systems in particular, are needed to provide Variable Valve Actuation (VVA). True variable valve actuation is contemplated as being sufficiently fast as to allow the lost motion system to assume more than one length within the duration of a single cam lobe motion, or at least during one cycle of the engine. By using a high speed mechanism to vary the length of the lost motion system, sufficiently precise control may be attained over valve actuation to enable more optimal valve actuation over a range of engine operating conditions. While many devices have been suggested for realizing various degrees of flexibility in valve timing and lift, lost motion hydraulic variable valve actuation is becoming recognized for superior potential in achieving the best mix of flexibility, low power consumption, and reliability.

Engine benefits from lost motion VVA systems can be achieved by creating complex cam profiles with extra lobes or bumps to provide auxiliary valve lifts in addition to the conventional main intake and exhaust events. Many unique modes of engine valve actuation may be produced by a VVA system that includes multi-lobed cams. For example, an intake cam profile may include an additional lobe for EGR prior to the main intake lobe, and/or an exhaust cam profile may include an additional lobe for EGR after the main exhaust lobe. Other auxiliary lobes for cylinder charging, and/or compression release may also be included on the cams. The lost motion VVA system may be used to selectively cancel or activate any or all combinations of valve lifts possible from the assortment of lobes provided on the intake and exhaust cams. As a result, significant improvements may be made to both positive power and engine braking operation of the engine.

The foregoing benefits are not necessarily limited to exhaust and intake valves. It is also contemplated by the present inventors that lost motion VVA may be applied to an auxiliary engine valve that is dedicated to some purpose other than intake or exhaust, such as for example engine braking or EGR. By providing an auxiliary engine valve cam with all of the possible actuations that may be desired and a lost motion VVA system, the actuation of the auxiliary valve may be varied for optimization at different engine speeds and conditions.

In view of the foregoing, the lost motion system and method embodiments of the present invention may be particularly useful in engines requiring variable valve actuation for positive power, engine braking valve events (such as, for example, compression release braking), and exhaust gas recirculation valve events.

Each of the foregoing types of valve events (main intake, main exhaust, engine braking, and exhaust gas recirculation) occur as a result of an engine valve being pushed into an engine cylinder to allow the flow of gases to and from the cylinder. Each event inherently has a starting (opening) time and an ending (closing) time, which collectively define the duration of the event. The starting and ending times may be marked relative to the position of the engine (usually the crankshaft position) at the occurrence of each. These valve events also inherently include a point at which the engine valve reaches its maximum extension into the engine cylinder, which is commonly referred to as the valve lift. Thus, each valve event can be defined, at least at a basic level, by its starting and ending time, and the valve lift.

If the lost motion system connecting the engine cam to the engine valve has a fixed length each time a particular lobe acts on the system, then the starting and ending times and the lift for each event marked by that lobe will be fixed. Furthermore, a lost motion system that has a fixed length over the duration of the entire cam revolution will produce a valve event in response to each lobe on the cam, assuming that the system does not incorporate a lash space between the lost motion system and the engine valve. If the lost motion system does not have a fixed length, then the optimal starting time, ending time, and lift of an engine valve will also not be "fixed," and may selectively varied for different engine operating modes and conditions (e.g., different engine load, fueling, cylinder cut-out, etc.), for different engine speeds, and for different environmental conditions. Accordingly, it is desirable to have a lost motion system that is capable of attaining variable lengths over the course of an engine cycle.

It is also desirable to provide optimal power and fuel efficiency during positive power operation of an engine. One advantage of various embodiments of the present invention is that they may be used to vary the intake and exhaust valve timing and/or lift to provide optimal power and fuel efficiency, if so desired. The use of a lost motion VVA system allows valve timing and/or lift to be varied in response to changing engine conditions, load and speed. These variations may be made in response to real-time sensing of engine conditions and/or pre-programmed instructions.

It is also desirable to reduce NOx and/or other polluting emissions from the exhaust of internal combustion engines, and diesel engines in particular. One advantage of various embodiments of the present invention is that they may be used to reduce NOx and other polluting emissions by carrying out internal exhaust gas recirculation or trapping residual exhaust gas using variable valve timing and auxiliary lifts of intake, exhaust, and/or auxiliary valves. By allowing exhaust gas to dilute the incoming fresh air charge from the intake manifold, lower peak combustion temperatures may be achieved without large increases in fuel consumption, which may result in less formation of pollution and more complete burning of hydrocarbons.

Also of great interest for diesel engines is the capability of the engine to have an engine braking mode. It is another advantage of various embodiments of the present invention that they may be used to optimize engine braking across an engine speed range, as well as modulate engine braking responsive to driver demand.

It is also desirable to provide engines with the ability to warm up faster by employing special valve timing during a brief period after the engine is started. Driver comfort and after-treatment device efficiencies may depend on how quickly an engine can be brought up to normal operating temperature. Yet another advantage of various embodiments of the present invention is that they may provide improved engine warm up. This can be achieved using a number of different techniques, including, but not limited to, early intake valve closing, EGR, changes in exhaust/intake valve overlap, cylinder cut-out of some cylinders, and even compression release braking of some cylinders during positive power to effectively make the engine work against itself.

The ability to provide cylinder cut-out may be useful not only during engine warm-up and not only for diesel engines. In some embodiments of the present invention, the lost motion VVA system may be adapted to lose all cam motions associated with an engine valve or even an engine cylinder. As a result, these lost motion VVA systems may be used to effectively "cut-out" or shut off one or more engine cylinders from inclusion in the engine. This ability may be used to vary the number of cylinders that fire during positive power, to add control over fuel efficiency and power availability. Cylinder cut-out may also increase exhaust gas temperature in the cylinders that continue to fire, thereby improving the efficiency of exhaust after-treatment. It is also contemplated that cylinder cut-out could be carried out sequentially at the time an engine is turned on and/or off to decrease the amount of out of balance shake that is produced by an engine during start-up and shut-down periods.

Additional advantages of the invention are set forth, in part, in the description that follows and, in part, will be apparent to one of ordinary skill in the art from the description and/or from the practice of the invention.

SUMMARY OF THE INVENTION

Applicants have developed an innovative variable valve actuation system for an internal combustion engine valve comprising: a hydraulic valve actuation system operatively connected to the engine valve; a first control valve operatively connected to the hydraulic valve actuation system, said first control valve adapted to selectively release hydraulic fluid from the hydraulic valve actuation system; and a second control valve operatively connected to the hydraulic valve actuation system, said second control valve adapted to selectively release hydraulic fluid from the hydraulic valve actuation system.

Applicants have also developed in a variable valve actuation system for one or more internal combustion engine valves, a innovative method of actuating an engine valve comprising the steps of: actuating an engine valve at least in part with a hydraulic valve actuation system; selectively releasing hydraulic fluid from the hydraulic valve actuation system by opening a first control valve; and selectively releasing hydraulic fluid from the hydraulic valve actuation system by opening a second control valve in the event the first control valve fails to previously release hydraulic fluid from the hydraulic valve actuation system.

Applicants have further developed an innovative hydraulic valve actuation system for an internal combustion engine valve comprising: a hydraulic passage providing hydraulic communication between a hydraulic fluid supply and a hydraulic valve actuator; a first control valve operatively connected to the hydraulic passage and adapted to selectively release hydraulic fluid from the hydraulic fluid passage; and a second control valve operatively connected to the hydraulic passage and adapted to selectively release hydraulic fluid from the hydraulic valve actuation system.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF THE PRESENT INVENTION

Figure 1:
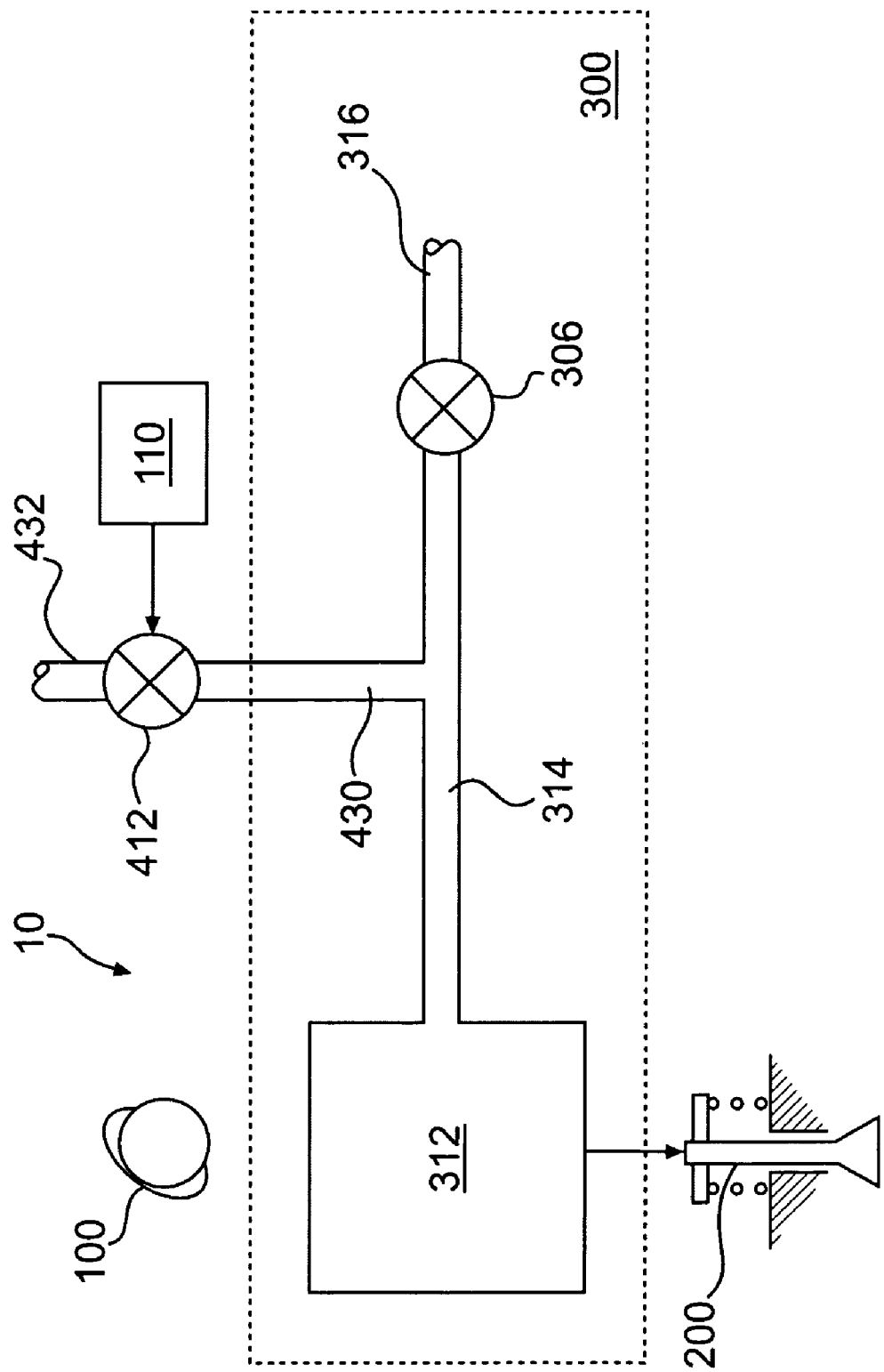
FIG. 1 is a schematic diagram of a valve actuation system according to a first embodiment of the present invention.

As embodied herein, the present invention includes both systems and methods of controlling the actuation of engine valves. Reference will now be made in detail to a first embodiment of the present invention, an example of which is illustrated in the accompanying drawings. A first embodiment of the present invention is shown in FIG. 1 as valve actuation system 10. The valve actuation system 10 may include a means for imparting motion 100 operatively connected to a hydraulic valve actuation system 300, which in turn is operatively connected to one or more engine valves 200. The motion imparting means 100 may include any combination of cam(s), push tube(s), rocker arm(s) or other valve train element(s) that provide an input motion to the hydraulic valve actuation system 300. For ease of discussion, the means for imparting motion will be referred to hereinafter as a cam 100.

The hydraulic valve actuation system 300 may selectively lose the motion input by the cam 100, transfer the motion input from the cam to the engine valves 200, and in some embodiments, extend the duration of the motion input from the cam to the engine valves. The motion transferred to the engine valves 200 and the loss of such motion may be used to produce various engine valve events, such as, but not limited to, main intake, main exhaust, compression release braking, bleeder braking, external and/or internal exhaust gas recirculation, early exhaust valve opening, early intake closing, centered lift, late exhaust and intake valve closing, etc. The valve actuation system 10, including the hydraulic valve actuation system 300, may be switched between a mode of losing motion and that of not losing motion in response to a signal or input from a controller (not shown). The engine valves 200 may be exhaust valves, intake valves, or auxiliary valves.

The hydraulic valve actuation system 300 may comprise any structure that at least in part hydraulically actuates the engine valves 200. The hydraulic valve actuation system 300 may comprise, for example, a mechanical linkage, a hydraulic circuit, a hydro-mechanical linkage, an electromechanical linkage, and/or any other linkage adapted to attain more than one operative length and actuate an engine valve.

The controller (not shown) may comprise any electronic or mechanical device for communicating with the hydraulic valve actuation system 300 and particularly with the first control valve 306. The controller may include a microprocessor linked to other engine components to determine and select the appropriate opening and closing times for the first control valve 306. Valve actuation may be optimized at a plurality of engine speeds and conditions by controlling the first control valve 306 based upon information collected by the microprocessor from engine components. Preferably, the controller may be adapted to operate the first control valve 306 at high speed (one or more times per engine cycle).

The hydraulic valve actuation system 300 may further include a hydraulic valve actuator 312, connected to the first control valve 306 by a hydraulic passage 314. The first control valve 306 may be selectively opened and closed to control hydraulic communication between the hydraulic valve actuator 312 and an outlet port 316. A second control valve 412 may be operatively connected to the hydraulic passage 314 by a second hydraulic passage 430. The second control valve 412 may be selectively opened and closed to control hydraulic communication between the hydraulic valve actuator 312 and a dump port 432. The second control valve 412 may be controlled (i.e., opened and closed) by a second means for imparting motion 110, which may constitute a cam, push tube, rocker arm, or any other combination of mechanical, hydraulic, or electrical apparatus.

With continued reference to FIG. 1, the valve actuation system 10 may operate as follows. Use of the hydraulic valve actuation system may be initiated by supplying hydraulic fluid to the system 300 via any means, including, but not limited to supply through either the outlet port 316 or the dump port 432. Once the hydraulic valve actuation system is filled with hydraulic fluid, the first control valve 306 and the second control valve 412 may be maintained in a closed position. As a result, hydraulic fluid may be trapped in the hydraulic valve actuation system and the motion imparted by the cam 100 to the system may be transferred to the engine valves 200. The transfer of motion may be carried out in conjunction with and/or by the hydraulic actuator 312.

The actuation of the engine valve 200 may be varied from that proscribed by the cam 100 by selectively releasing hydraulic fluid from the hydraulic valve actuator 312. Specifically, when it is desirable to close the engine valve 200, the first control valve 306 may be selectively opened to release hydraulic fluid from the hydraulic valve actuation system 300 through the outlet port 316. The release of this hydraulic fluid may permit the hydraulic valve actuator 312 to collapse and the engine valve 200 to close. Preferably, the first control valve 306 may be a high speed solenoid controlled trigger valve capable of releasing hydraulic fluid from the hydraulic valve actuator 312 with sufficient precision to provide an engine valve event with a predetermined lift and duration.

The second control valve 412 may also be selectively opened to release hydraulic fluid from the hydraulic valve actuation system 300 through the dump port 432. The second control valve 412 may be opened and closed by the second motion imparting means 110. The combination of the second control valve 412 and the second motion imparting means 110 may act as a back-up hydraulic fluid release system for the first control valve 306. In the event that the first control valve 306 fails to open at the desired time for the desired valve actuation, the second control valve 412 may open to prevent the engine valve 200 from remaining open longer than desired.

Figure 4:
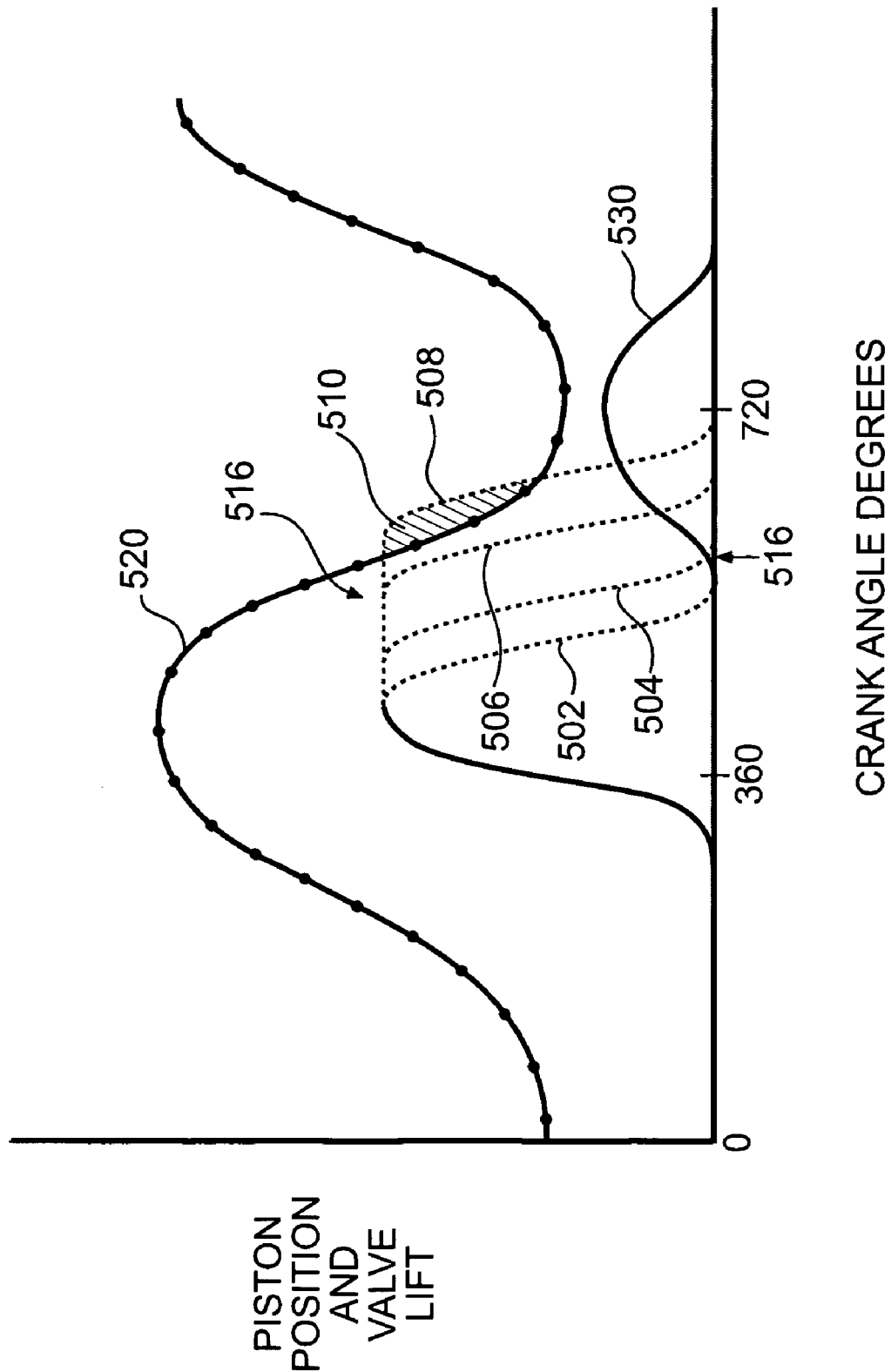
FIG. 4 is a graph of variable valve actuations and engine piston position that may be obtained using various embodiments of the present invention.

Examples of variable engine valve events that may be provided by the hydraulic valve actuation system that utilizes both the first control valve 306 and the second control valve 412 are shown in FIG. 4. With reference to FIGS. 1 and 4, engine valve event 502 may be provided by the cam 100 in a first cylinder without the influence of the hydraulic valve actuation system 300. Engine piston motion in the first cylinder is shown in FIG. 4 as plot 520. A variety of alternative engine valve events 504, 506, and 508 are also shown in FIG. 4. Engine valve actuations 504 and 506 may be achieved through the selective use of the first and second control valves 306 and 412. Valve event 504 may be provided by opening the first control valve 306 at a selected time such that the hydraulic valve actuator 312 collapses and the engine valve is permitted to close. If the first control valve 306 fails to open for the late engine valve closing event 504, or opens too late, as represented by plot 508, contact between the engine valve and the engine piston may result. This contact is represented by the overlap region 510.

The inclusion of the second control valve 412 may prevent the engine valve from contacting the engine piston by assuring that the hydraulic fluid in the hydraulic valve actuation system 300 begins to be released through the dump port 432 no later than the time corresponding to point 516 during valve event 506. Opening the second control valve 412 no later than point 516 assures that the hydraulic fluid will be released from the hydraulic valve actuation system 300, and consequently that the engine valve will begin to close no later than that time. Accordingly, the assured opening of the second control valve 412 no later than point 516 may prevent undesired contact between the engine valve being actuated and the engine piston.

In the foregoing embodiment of the present invention, the first control valve 306 preferably may be a high-speed solenoid driven trigger valve. While such valves may provide precisely timed release of hydraulic fluid from the hydraulic valve actuation system 300, they also may fail in a closed position for any of a number of reasons. Absent the inclusion of the second control valve 412, failure of the first control valve 306 could cause the engine valve 200 to remain open at least long enough to contact the engine piston. Inclusion of the second control valve 412 and a means for assuredly opening the second control valve 110 no later than a predetermined point (e.g., point 516 in FIG. 4) in the engine cycle may prevent the possibility of engine valve to engine piston contact in the event of a failure of the first control valve 306.

Figure 2:
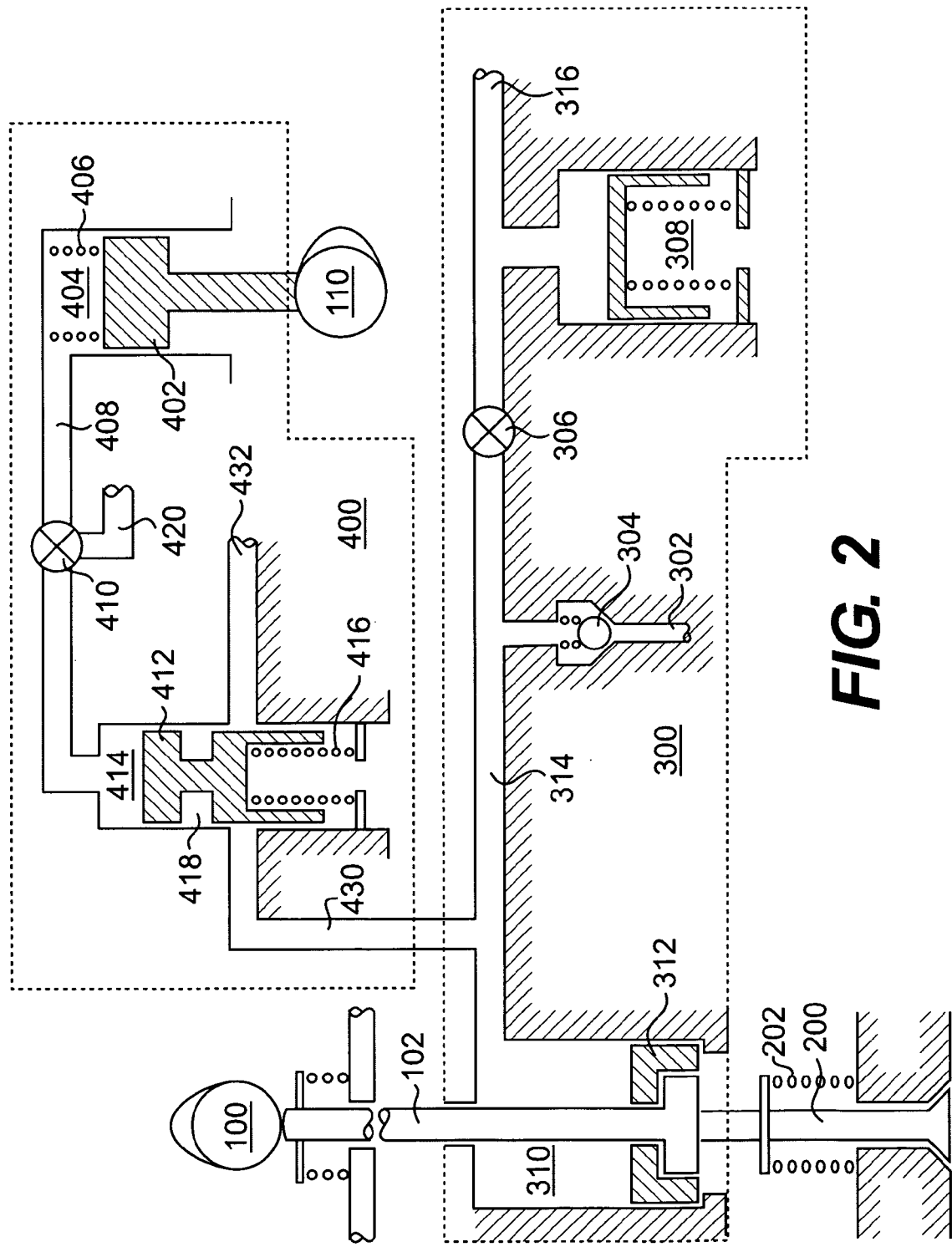
FIG. 2 is a schematic diagram of a valve actuation system according to a second embodiment of the present invention.
Figure 3:
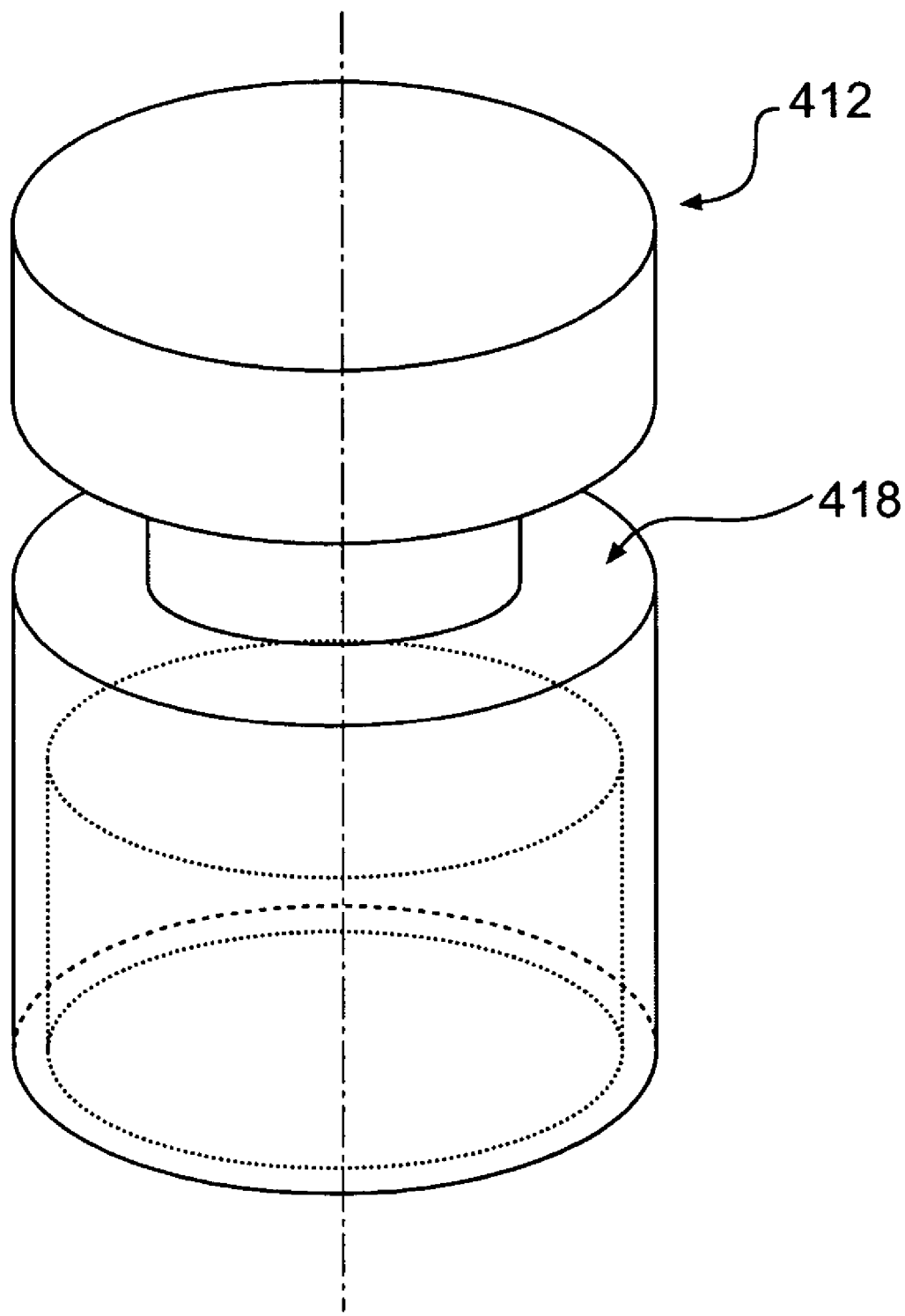
FIG. 3 is an isometric view of a control valve capable of being used in the second embodiment of the present invention.

A second embodiment of the present invention is shown in FIG. 2 as valve actuation system 10. The valve actuation system 10 may include a cam 100 operatively connected to a hydraulic valve actuation system 300, which in turn is operatively connected to one or more engine valves 200. The motion imparting means 100 may include any combination of cam(s), push tube(s), rocker arm(s) or other valve train element(s) that provide an input motion to the hydraulic valve actuation system 300. In the embodiment of FIG. 2, a push tube 102 is disposed between the cam 100 and the engine valve 200. The push tube 102 may include an enlarged lower portion near or in contact with the engine valve 200. The engine valve 200 may be biased upward by one or more valve springs 202 into contact with the push tube 102.

The hydraulic valve actuation system 300 may include a hydraulic valve actuator 312. The hydraulic valve actuator 312 may be generally ring shaped with a central opening and slidably disposed in a hydraulic valve actuator bore 310. The push tube 102 may extend through the central opening in the hydraulic valve actuator 312. The enlarged lower portion of the push tube 102 may be adapted to engage a lower portion of the hydraulic valve actuator 312.

The hydraulic passage 314 may provide hydraulic communication between the hydraulic valve actuator bore 310 and the first control valve 306. The first control valve 306 may be selectively opened and closed by an ECM or other controller (not shown) to control hydraulic communication between the hydraulic valve actuator bore 310 and the outlet port 316. Hydraulic fluid may be supplied to the hydraulic passage 314 and hydraulic valve actuator bore 310 through a supply passage 302 and check valve 304. A hydraulic fluid accumulator 308 may also be connected to the hydraulic passage 314.

A second control valve 412 may communicate hydraulically with the hydraulic passage 314 via a second hydraulic passage 430. The second control valve 412 may be slidably disposed in a second control valve bore 414 and biased into a predetermined position by a second control valve spring 416. The second control valve 412 may further include an annular indentation or ring 418 or other feature adapted to permit selective hydraulic communication between the second hydraulic passage 430 and a dump port 432. The dump port 432 may release hydraulic fluid to a point outside of the valve actuation system 10. The second control valve bore 414 may be connected to a master piston bore 404 by a third hydraulic passage 408. A master piston 402 may be slidably disposed in the master piston bore 404 and biased into contact with a second means for imparting motion (e.g., a second cam) 110 by a master piston spring 406. A third valve 410 may be provided in the third hydraulic passage 408 between the master piston bore 404 and the second control piston bore 414. The third valve 410 may selectively connect the third hydraulic passage 408 with a drain port 420. The drain port 420 may provide a means for draining hydraulic fluid from the third hydraulic fluid passage 408, the second control valve bore 414, and the master piston bore 404, as well as a means for supplying hydraulic fluid to each of these locations. Alternatively, a separate means for supplying hydraulic fluid to the third hydraulic passage (not shown) may be provided.

With continued reference to FIG. 2, the valve actuation system 10 may provide mechanical and hydraulic valve actuation as follows. Conventional mechanical actuation of the engine valve 200 may be achieved by rotating the cam 100 so that the lobe on the cam repeatedly pushes the push tube 102 downward and opens the engine valve in accordance with the shape of the cam lobe.

The fixed time valve actuation produced by the foregoing mechanical system may be varied using the hydraulic valve actuation system 300. The hydraulic valve actuation system may be activated by supplying hydraulic fluid to the system through the supply passage 302 while the first control valve 306 and the second control valve 412 are closed. At this time, hydraulic fluid supplied to the hydraulic passage 314 may fill the hydraulic valve actuator bore 310 and force the hydraulic valve actuator 312 into contact with the enlarged portion of the push tube 102. The check valve 304 and the closed first control valve 306 and second control valve 412 may prevent hydraulic fluid from escaping from the hydraulic valve actuator bore 310 and the hydraulic passage 314. It is appreciated that small amounts of hydraulic fluid may escape from the system past the seal formed between the hydraulic valve actuator 312 and the hydraulic valve actuator bore 310 as well as past the seal formed between the hydraulic valve actuator and the push tube 102.

The first control valve 306 is preferably an electronically controlled solenoid actuated trigger valve and may be maintained closed by an ECM (not shown) or other control device in order to fill the hydraulic valve actuation system 300 with fluid. The second control valve 412 is preferably hydraulically actuated by the master piston 402 under the mechanical influence of the second cam 110. The second control valve may remain closed for a sufficient amount of time to fill the hydraulic valve actuation system 300 with fluid regardless of whether the hydraulic circuit connecting the second control valve 412 with the master piston 402 is itself filled with hydraulic fluid. In the event the third valve 410 is open, communication is provided between the third hydraulic passage 408 and the drain port 420. As a result there is insufficient fluid in the circuit for the master piston 402 to actuate the second control valve 412 and the second control piston spring 416 may maintain the second control piston 412 in the closed position shown in FIG. 2 (i.e., a position that blocks the flow of fluid from the second hydraulic passage 430 to the dump port 432). Alternatively, if the third valve 410 is closed, the second control valve 412 still may be closed long enough to enable the hydraulic valve actuation system 300 to fill with hydraulic fluid. When the third valve 410 is closed, and the third hydraulic passage 408, second control valve bore 414 and master piston bore 404 are filled with fluid, the lobe on the second cam 110 may actuate (i.e., open) the second control valve 412 once per engine cycle acting through the intervening master piston 402 and hydraulic circuit. An exemplary second control valve actuation is shown as plot 530 in FIG. 4.

However, the second control valve 412 may be closed at all times other than during the actuation 530, and during these times the hydraulic valve actuation system 300 may fill with fluid from the supply passage 302.

The cam 100 may actuate the engine valve 200 through push tube 102 while the first control valve 306 and the second control valve 412 are closed and the hydraulic valve actuation system 300 is filling with hydraulic fluid. During the mechanical actuation of the engine valve the hydraulic valve actuator 312 may follow the push tube 102 downward, all while additional hydraulic fluid flows into the system from the supply passage 302. When the push tube 102 reaches its maximum downward displacement the hydraulic valve actuator 312 may also cease moving downward. Absent the presence of the hydraulic valve actuator 312, the push tube 102 would translate back upward in accordance with the profile of the cam 100. The hydraulic valve actuator 312 prevents the push tube 102 from returning because it is hydraulically locked into a fixed position. As a result, the engine valve 200 may be kept open with a fixed lift until the hydraulic lock of the hydraulic valve actuator 312 is released by opening either the first control valve 306 or the second control valve 412.

FIG. 4 provides examples of variable engine valve events that may be provided by the hydraulic valve actuation system shown in FIG. 2. With reference to FIGS. 2 and 4, engine valve event 502 may be provided by the cam 100 in a first cylinder without the influence of the hydraulic valve actuation system 300. In other words, the valve event 502 may be provided when the hydraulic valve actuation system 300 is not charged with fluid or the first control valve 306 is maintained open throughout the engine cycle. Alternative engine valve event 504 may be provided by selectively opening the first control valve 306 after the time that the engine valve would normally begin to close. If the first control valve 306 fails to open, or opens too late as represented by event 508, contact between the engine valve and the engine piston could result. This potential contact is represented by the overlap region 510.

The inclusion of the second control valve 412 may prevent the engine valve 200 from contacting the engine piston. In the event that the first control valve 306 fails in a closed position, the second control valve 412 may release the hydraulic fluid from the system 300 when it is actuated by the second cam 110. The second cam 110 may be designed and/or selected to actuate the second control valve 412 in accordance with the motion shown as plot 530 beginning at point 516 in FIG. 4. As the second control valve 412 translates downward beginning at point 516, the annular indentation 418 in the second control valve may register with the second hydraulic passage 430 and the dump port 432. As a result, the hydraulic fluid in the system 300 may be released through the dump port 432 and the engine valve 200 may close. Opening the second control valve 412 no later than point 516 assures that the engine valve 200 will begin to close no later than that time and that undesired contact between the engine valve and the engine piston may be prevented in the event that the first control valve 306 fails or does not open at the required time.

In an alternative embodiment of the present invention, the valve actuation system shown in FIG. 2 may be modified such that the third valve 410 is a check valve and the drain port 420 is also a hydraulic supply passage.

It will be apparent to those skilled in the art that variations and modifications of the present invention can be made without departing from the scope or spirit of the invention. For example, the components and arrangement of the hydraulic valve actuation system and the hydraulic control valves used therewith are presented as examples only. It is contemplated that modifications and variations of the valve actuation system and control valves may be used in alternative embodiments of the invention without departing from the scope of the appended claims. Thus, it is intended that the scope of the present claims cover all such modifications and variations of the invention.

What is claimed is:

1. A variable valve actuation system for an internal combustion engine valve comprising:
    a hydraulic valve actuation system operatively connected to the engine valve;
    a first control valve operatively connected to the hydraulic valve actuation system, said first control valve adapted to selectively release hydraulic fluid from the hydraulic valve actuation system to close the engine valve; and
    a second control valve operatively connected to the hydraulic valve actuation system, said second control valve adapted to selectively release hydraulic fluid from the hydraulic valve actuation system to close the engine valve independent of the operation of the first control valve to selectively release hydraulic fluid from the hydraulic valve actuation system, and wherein said first control valve is further adapted to selectively release hydraulic fluid from the hydraulic valve actuation system independent of the operation of the second control valve.

2. The variable valve actuation system of claim 1 wherein: said first control valve is a solenoid controlled valve, and said second control valve is hydraulically actuated.

3. The variable valve actuation system of claim 1 wherein: said first control valve is an electrically controlled trigger valve, and said second control valve is hydraulically actuated.

4. The variable valve actuation system of claim 1 further comprising: a hydraulic fluid dump port operatively connected to the second control valve; a master piston slidably disposed in a master piston bore; and a first hydraulic passage extending between the master piston and the second control valve.

5. The variable valve actuation system of claim 4 wherein said second control valve comprises: a slave piston bore; a slave piston slidably disposed in the slave piston bore, said slave piston being adapted to provide selective hydraulic communication between the hydraulic valve actuation system and the hydraulic fluid dump port; and means for biasing the slave piston into a pre-selected position.

6. The variable valve actuation system of claim 5 wherein the pre-selected position is one in which hydraulic communication is provided between the hydraulic valve actuation system and the hydraulic fluid dump port.

7. The variable valve actuation system of claim 5 wherein the pre-selected position is one in which hydraulic communication is blocked between the hydraulic valve actuation system and the hydraulic fluid dump port.

8. The variable valve actuation system of claim 5 wherein the slave piston further comprises an annular ring formed in the wall of the slave piston.

9. The variable valve actuation system of claim 5 wherein the slave piston further comprises one or more internal hydraulic fluid passages.

10. The variable valve actuation system of claim 5 further comprising means for controlling the supply of hydraulic fluid to the first hydraulic passage.

11. The variable valve actuation system of claim 10 wherein the means for controlling the supply of hydraulic fluid to the first hydraulic passage is operatively connected to the first control valve.

12. The variable valve actuation system of claim 1 wherein the hydraulic valve actuation system comprises: a hydraulic piston bore; a hydraulic piston slidably disposed in the hydraulic piston bore; and means for transferring an engine valve actuation force to the engine valve.

13. The variable valve actuation system of claim 12 wherein the hydraulic piston comprises a collar shape.

14. In a variable valve actuation system for one or more internal combustion engine valves having a hydraulic valve actuation system and first and second control valves, a method of actuating an engine valve comprising the steps of:
   actuating the engine valve at least in part with the hydraulic valve actuation system;
   selectively releasing hydraulic fluid from the hydraulic valve actuation system to close the engine valve by opening the first control valve independently of the operation of the second control valve; and
   selectively releasing hydraulic fluid from the hydraulic valve actuation system to close the engine valve by opening the second control valve independently of the operation of the first control valve.

15. The method of claim 14 wherein the step of selectively releasing hydraulic fluid from the hydraulic valve actuation system by opening a second control valve comprises the step of: hydraulically actuating the second control valve to release hydraulic fluid from the hydraulic valve actuation system.

16. The method of claim 15 wherein the step of selectively releasing hydraulic fluid from the hydraulic valve actuation system by opening a first control valve comprises the step of: electrically actuating the first control valve to release hydraulic fluid from the hydraulic valve actuation system.

17. The method of claim 14 wherein the step of selectively releasing hydraulic fluid from the hydraulic valve actuation system by opening a first control valve comprises the step of: electrically actuating the first control valve to release hydraulic fluid from the hydraulic valve actuation system.

18. The method of claim 14 wherein the step of selectively releasing hydraulic fluid from the hydraulic valve actuation system by opening a second control valve comprises the step of: mechanically actuating the second control valve to release hydraulic fluid from the hydraulic valve actuation system.

19. The variable valve actuation system of claim 1 wherein: said first control valve is a solenoid actuated valve, and said second control valve is mechanically actuated.

20. A hydraulic valve actuation system for an internal combustion engine valve comprising:
   a hydraulic passage providing hydraulic communication between a hydraulic fluid supply and a hydraulic valve actuator;
   a first control valve operatively connected to the hydraulic passage and adapted to selectively release hydraulic fluid from the hydraulic fluid passage to close the engine valve; and
   a second control valve operatively connected to the hydraulic passage and adapted to selectively release hydraulic fluid from the hydraulic valve actuation system to close the engine valve, independent of the operation of the first control valve to selectively release hydraulic fluid from the hydraulic valve actuation system, and wherein said first control valve is further adapted to selectively release hydraulic fluid from the hydraulic valve actuation system independent of the operation of the second control valve.

21. The hydraulic valve actuation system of claim 20 wherein: said first control valve is a solenoid controlled valve, and said second control valve is hydraulically actuated.

22. The hydraulic valve actuation system of claim 1 wherein: said first control valve is a solenoid actuated valve, and said second control valve is mechanically actuated.

23. The variable valve actuation system of claim 12 wherein the hydraulic piston is adapted to selectively maintain the engine valve open longer than the means for transferring an engine valve actuation force to the engine valve.

\* \* \* \* \*